United States Patent
Gupta et al.

(10) Patent No.: US 9,439,077 B2
(45) Date of Patent: Sep. 6, 2016

(54) METHOD FOR MALICIOUS ACTIVITY DETECTION IN A MOBILE STATION

(71) Applicant: QUALCOMM Incorporated, San Diego, CA (US)

(72) Inventors: Rajarshi Gupta, Sunnyvale, CA (US); Saumitra Mohan Das, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 453 days.

(21) Appl. No.: 13/741,388

(22) Filed: Jan. 15, 2013

(65) Prior Publication Data

US 2013/0267201 A1    Oct. 10, 2013

Related U.S. Application Data

(60) Provisional application No. 61/622,463, filed on Apr. 10, 2012.

(51) Int. Cl.
*H04W 12/12*     (2009.01)
*G06F 21/55*     (2013.01)
*H04L 29/06*     (2006.01)

(52) U.S. Cl.
CPC .............. *H04W 12/12* (2013.01); *G06F 21/55* (2013.01); *G06F 21/552* (2013.01); *H04L 63/1416* (2013.01); *H04L 63/145* (2013.01)

(58) Field of Classification Search
CPC .... G06F 21/55; G06F 21/554; G06F 21/566; G06F 21/50; G06F 21/56; G06Q 30/0224; H04L 67/22; H04L 63/1416; H04L 63/1425; H04L 63/145; H04W 12/12; H04W 4/028; H04W 52/0258
See application file for complete search history.

(56) References Cited

U.S. PATENT DOCUMENTS

| | | | |
|---|---|---|---|
| 8,201,244 B2 * | 6/2012 | Sun et al. | 726/22 |
| 2007/0123214 A1 | 5/2007 | Mock | |
| 2007/0174917 A1 * | 7/2007 | Guruswamy | H04L 63/1433 726/25 |
| 2010/0151882 A1 * | 6/2010 | Gillies | G06Q 30/02 455/456.1 |
| 2010/0269175 A1 * | 10/2010 | Stolfo et al. | 726/22 |
| 2010/0311448 A1 * | 12/2010 | Simonsson | H04W 4/06 455/466 |
| 2010/0313270 A1 * | 12/2010 | Kim | G06F 1/28 726/24 |
| 2011/0047594 A1 | 2/2011 | Mahaffey et al. | |
| 2011/0219451 A1 | 9/2011 | McDougal et al. | |

(Continued)

FOREIGN PATENT DOCUMENTS

WO     2010141826 A2     12/2010

OTHER PUBLICATIONS

International Search Report and Written Opinion—PCT/US2013/035586—ISA/EPO—Jul. 11, 2013.

*Primary Examiner* — Nizar Sivji
(74) *Attorney, Agent, or Firm* — Won Tae C. Kim (57) ABSTRACT

Disclosed is a method for malicious activity detection in a mobile station of a particular model. In the method, generic malicious behavior patterns are received from a network-based malicious behavior profiling system. Mobile-station-model-specific-behavior-analysis algorithms are generated in the mobile station based on the generic malicious behavior patterns. Mobile station operations may be observed to generate a mobile station activity observation. The mobile station activity observation may be analyzed using the mobile-station-model-specific-behavior-analysis algorithms to generate an activity analysis. Malicious activity may be detected based on the activity analysis.

13 Claims, 5 Drawing Sheets

(56) References Cited

U.S. PATENT DOCUMENTS

| | | |
|---|---|---|
| 2011/0271341 A1 | 11/2011 | Satish et al. |
| 2012/0096539 A1 | 4/2012 | Hu et al. |
| 2012/0110174 A1 | 5/2012 | Wootton et al. |
| 2012/0315960 A1* | 12/2012 | Kim .............................. 455/574 |

* cited by examiner

| Model | Accelerometer | Gyroscope |
|-------|---------------|-----------|
| A | Yes | Yes |
| B | Yes | No |
| C | No | Yes |

FIG. 6

METHOD FOR MALICIOUS ACTIVITY DETECTION IN A MOBILE STATION

CROSS-REFERENCE TO RELATED APPLICATION

This application claims the benefit of U.S. Provisional Application No. 61/622,463, filed Apr. 10, 2012, which application is incorporated herein by reference.

BACKGROUND

1. Field

The present invention relates generally to detecting malicious activity in a mobile station.

2. Background

Detection of malware on a mobile station, such as a cellular telephone, is constrained by the device's limited resources (power, memory, bandwidth, etc.). Thus, PC-style signature matching on a mobile device is not an effective solution for malware detection and removal. An alternative is for a thin client on a device to generate a signature/hash of installed applications, and to forward the signature(s) to a network-based server for signature matching. However, network-based signature matching generally fails to protect against "zero-day" attacks, or against web-applications and web-based malware.

There is therefore a need for a technique for detecting malicious activity in a mobile station in an effective manner.

SUMMARY

An aspect of the present invention may reside in a method for malicious activity detection in a mobile station of a particular model. In the method, a mobile station activity observation is analyzed using mobile-station-model-specific-behavior-analysis algorithms to generate an activity analysis. The mobile-station-model-specific-behavior-analysis algorithms are generated in the mobile station based on generic malicious behavior patterns received from a network-based malicious behavior profiling system. Malicious activity is detected based on the activity analysis.

In more detailed aspects of the invention, mobile station operations may be observed to generate the mobile station activity observation. The generic malicious behavior patterns may not be specific to the particular model of the mobile station. Also, the mobile station operations may include activities of a Webkit, high-level operating system (HLOS), kernel, driver, and/or hardware.

Another aspect of the invention may reside in a mobile station, comprising: means for analyzing a mobile station activity observation using mobile-station-model-specific-behavior-analysis algorithms to generate an activity analysis, wherein the mobile-station-model-specific-behavior-analysis algorithms are generated in the mobile station based on generic malicious behavior patterns received from a network-based malicious behavior profiling system; and means for detecting malicious activity based on the activity analysis.

In more detailed aspects of the invention, the mobile station may further comprise means for observing mobile station operations to generate the mobile station activity observation.

Another aspect of the invention may reside in a mobile station, comprising a processor configured to: analyze a mobile station activity observation using mobile-station-model-specific-behavior-analysis algorithms to generate an activity analysis, wherein the mobile-station-model-specific-behavior-analysis algorithms are generated in the mobile station based on generic malicious behavior patterns received from a network-based malicious behavior profiling system; and detect malicious activity based on the activity analysis.

In more detailed aspects of the invention, the processor may be further configured to observe mobile station operations to generate the mobile station activity observation.

Another aspect of the invention may reside in a computer program product, comprising computer-readable medium, comprising: code for causing a computer to analyze a mobile station activity observation using mobile-station-model-specific-behavior-analysis algorithms to generate an activity analysis, wherein the mobile-station-model-specific-behavior-analysis algorithms are based on generic malicious behavior patterns received from a network-based malicious behavior profiling system; code for causing a computer to detect malicious activity based on the activity analysis.

In more detailed aspects of the invention, the computer-readable medium may further comprise code for causing a computer to observe mobile station operations to generate the mobile station activity observation.

An aspect of the present invention may reside in another method for malicious activity detection in a mobile station of a particular model. In the method, generic malicious behavior patterns are received from a network-based malicious behavior profiling system. Mobile-station-model-specific-behavior-analysis algorithms are generated by the mobile station based on the generic malicious behavior patterns.

In more detailed aspects of the invention, mobile station operations may be observed to generate an activity observation. The activity observation may be analyzed using the mobile-station-model-specific-behavior-analysis algorithms to generate an activity analysis. Malicious activity may be detected based on the activity analysis.

Another aspect of the invention may reside in a mobile station, comprising: means for receiving generic malicious behavior patterns from a network-based malicious behavior profiling system; and means for generating mobile-station-model-specific-behavior-analysis algorithms based on the generic malicious behavior patterns.

Another aspect of the invention may reside in a mobile station, comprising a processor configured to: receive generic malicious behavior patterns from a network-based malicious behavior profiling system; and generate mobile-station-model-specific-behavior-analysis algorithms based on the generic malicious behavior patterns.

Another aspect of the invention may reside in a computer program product, comprising computer-readable medium, comprising: code for causing a computer to receive generic malicious behavior patterns from a network-based malicious behavior profiling system; and code for causing a computer to generate mobile-station-model-specific-behavior-analysis algorithms based on the generic malicious behavior patterns.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 2:
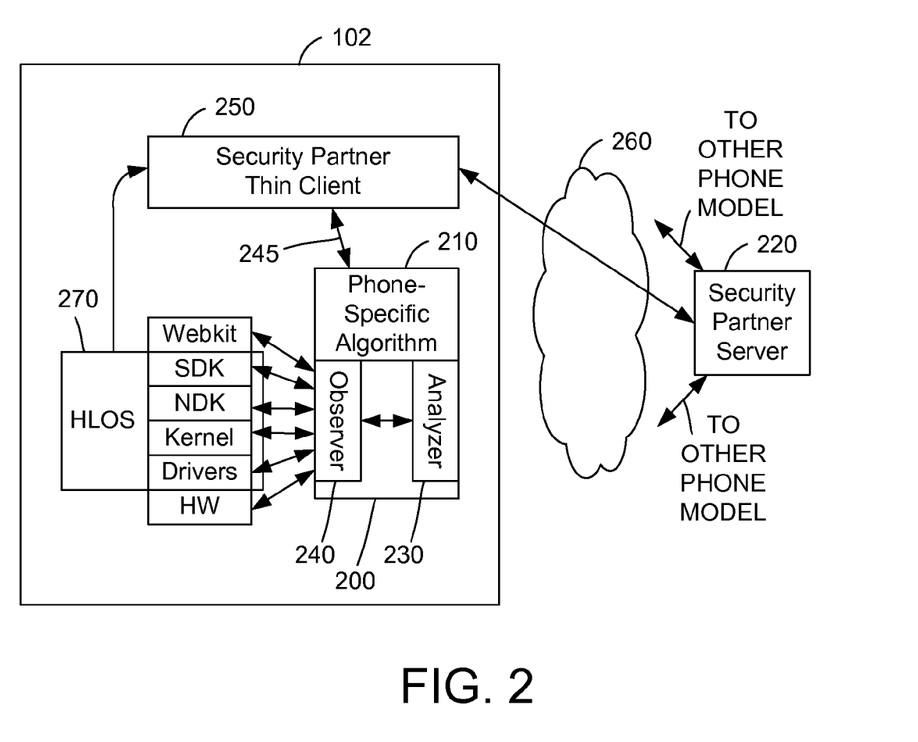
FIG. 2 is a block diagram of an example of a mobile station for detecting malicious activity in conjunction with generic malicious behavior patterns received from a network-based server.
Figure 3:
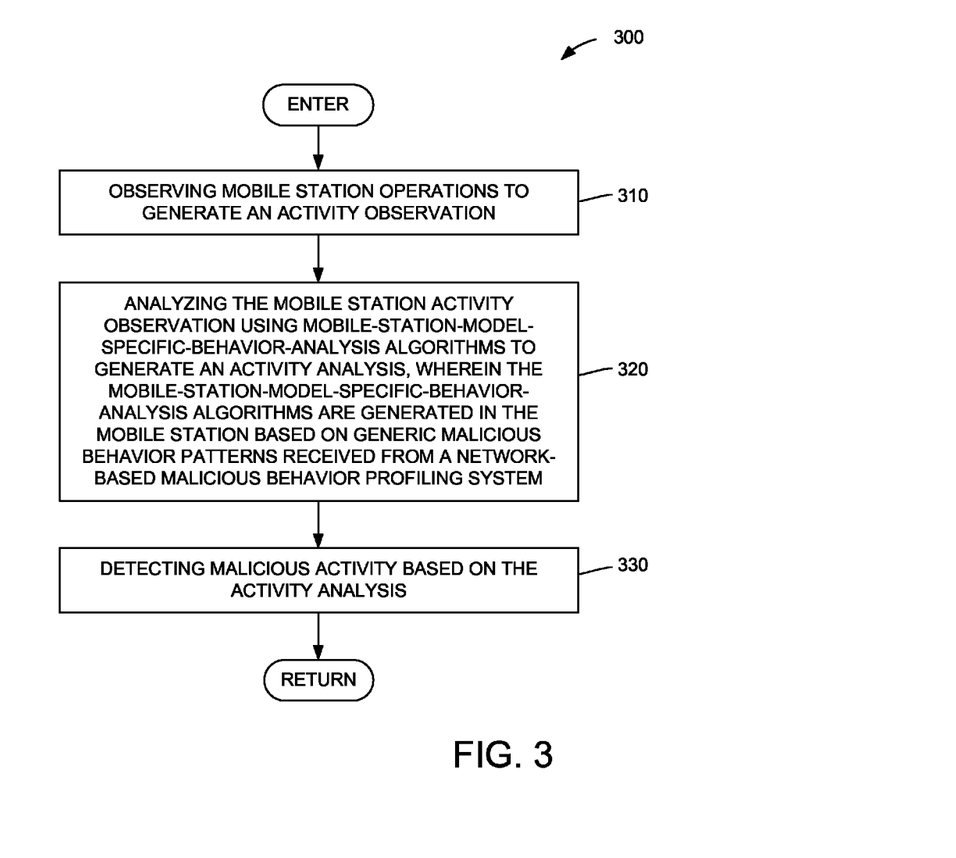
FIG. 3 is a flow diagram of a method for detecting malicious activity in a mobile station, according to the present invention.

With reference to FIGS. 2 and 3, an aspect of the present invention may reside in a method 300 for malicious activity detection in a mobile station 102 of a particular model. In the method, mobile station operations are observed to generate a mobile station activity observation (step 310). The mobile station activity observation is analyzed using mobile-station-model-specific-behavior-analysis algorithms 210 to generate an activity analysis (step 320). The mobile-station-model-specific-behavior-analysis algorithms are generated in the mobile station based on generic malicious behavior patterns received from a network-based malicious behavior profiling system 220. Malicious activity is detected based on the activity analysis (step 330).

In more detailed aspects of the invention, the generic malicious behavior patterns may not be specific to the particular model of the mobile station 102. Also, the mobile station operations may include activities of a Webkit, high-level operating system (HLOS), software development kit (SDK), native code development kit (NDK), kernel, driver, and/or hardware.

Figure 5:
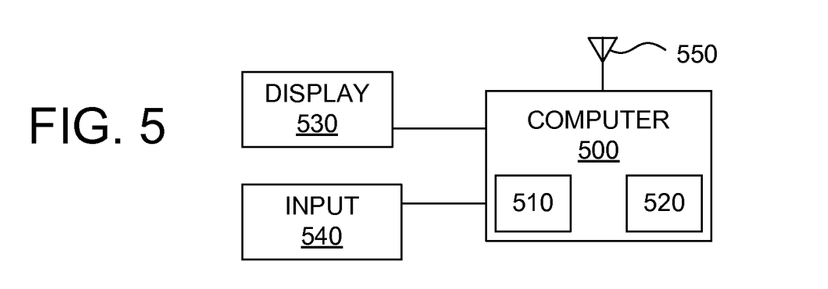
FIG. 5 is a block diagram of a computer including a processor and a memory.

With additional reference to FIG. 5, another aspect of the invention may reside in a mobile station 102, comprising: means 510 for observing mobile station operations to generate a mobile station activity observation; means 510 for analyzing the mobile station activity observation using mobile-station-model-specific-behavior-analysis algorithms 210 to generate an activity analysis, wherein the mobile-station-model-specific-behavior-analysis algorithms are generated in the mobile station based on generic malicious behavior patterns received from a network-based malicious behavior profiling system 220; and means 510 for detecting malicious activity based on the activity analysis.

Another aspect of the invention may reside in a mobile station 102, comprising a processor 510 configured to: observe mobile station operations to generate a mobile station activity observation; analyze the mobile station activity observation using mobile-station-model-specific-behavior-analysis algorithms 210 to generate an activity analysis, wherein the mobile-station-model-specific-behavior-analysis algorithms are generated in the mobile station based on generic malicious behavior patterns received from a network-based malicious behavior profiling system 220; and detect malicious activity based on the activity analysis.

Another aspect of the invention may reside in a computer program product, comprising computer-readable medium 520, comprising: code for causing a computer 500 to observe mobile station operations to generate a mobile station activity observation; code for causing a computer 500 to analyze the mobile station activity observation using mobile-station-model-specific-behavior-analysis algorithms 210 to generate an activity analysis, wherein the mobile-station-model-specific-behavior-analysis algorithms are generated in the mobile station based on generic malicious behavior patterns received from a network-based malicious behavior profiling system 220; code for causing a computer 500 to detect malicious activity based on the activity analysis.

Figure 4:
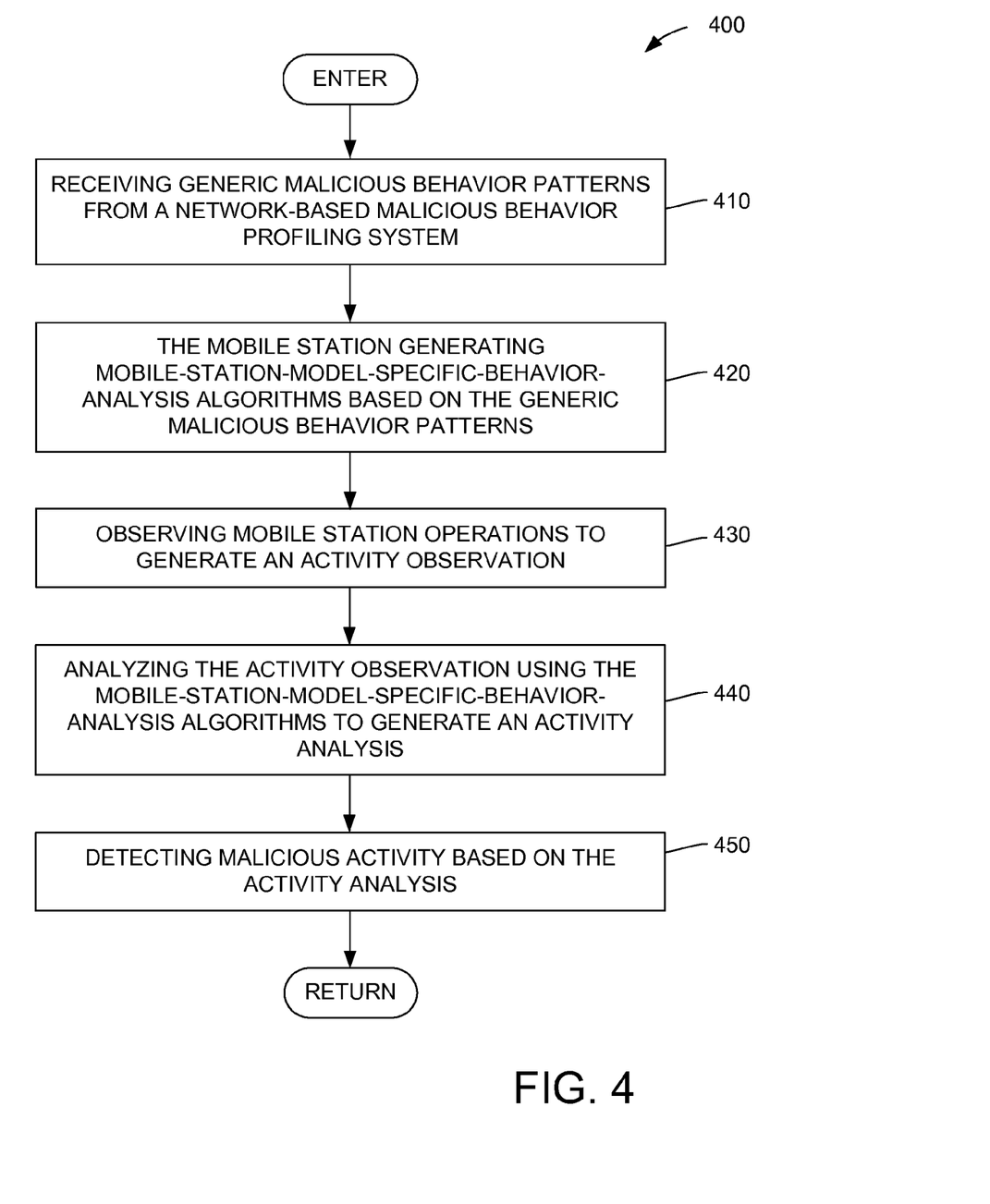
FIG. 4 is a flow diagram of another method for detecting malicious activity in a mobile station, according to the present invention.

With further reference to FIG. 4, an aspect of the present invention may reside in another method 400 for malicious activity detection in a mobile station of a particular model. In the method, generic malicious behavior patterns are received from a network-based malicious behavior profiling system 220 (step 410). Mobile-station-model-specific-behavior-analysis algorithms 210 are generated in the mobile station based on the generic malicious behavior patterns (step 420).

In more detailed aspects of the invention, mobile station operations may be observed to generate an activity observation (step 430). The activity observation may be analyzed using the mobile-station-model-specific-behavior-analysis algorithms 210 to generate an activity analysis (step 440). Malicious activity may be detected based on the activity analysis (step 450).

Another aspect of the invention may reside in a mobile station 102, comprising: means 510 for receiving generic malicious behavior patterns from a network-based malicious behavior profiling system 220; and means 510 for generating mobile-station-model-specific-behavior-analysis algorithms 210 based on the generic malicious behavior patterns.

Another aspect of the invention may reside in a mobile station 102, comprising a processor 510 configured to: receive generic malicious behavior patterns from a network-based malicious behavior profiling system 220; and generate mobile-station-model-specific-behavior-analysis algorithms 210 based on the generic malicious behavior patterns.

Another aspect of the invention may reside in a computer program product, comprising computer-readable medium 520, comprising: code for causing a computer 500 to receive generic malicious behavior patterns from a network-based malicious behavior profiling system 220; and code for causing a computer 500 to generate mobile-station-model-specific-behavior-analysis algorithms 210 based on the generic malicious behavior patterns.

The mobile station 102 may comprise a computer 500 that includes a processor 510, a storage medium 520 such as memory and/or a disk drive, a display 530, and an input such as a keypad 540, and a wireless connection 550.

The technique uses a split client-server architecture and has a benefit of allowing security experts to define and map malware behavior. The security partner may concentrate on malicious behavior definition and provide the generic malicious behavior patterns in a manner agnostic to mobile station models, and available hardware and sensors on the mobile station 102 (e.g., phone or device). The translation of the high-level behavior patterns (e.g. in the form of XML queries) into model-specific behavior analysis algorithms 210 allows access to low level drivers/HW, efficient queries through dynamic interaction of an analyzer 230 with an observer 240, and hooks in hardware, sensors, and drivers to enable efficient access. A thin client 250 connects with the security partner server 220 across a network such as the internet 260, receives the generic malicious behavior patterns for deriving the phone-specific algorithm 210, and connects with a high-level operating system (HLOS) 270.

Executing behavior analysis on mobile station 102 in partnership with a cloud server 220 allows the mapping of behavior to malware to be performed by security expertise in the cloud, and allows the mapping of behavior to model-specific behavior analysis algorithms and observation to be performed on the mobile station.

One or more application program interface (API) calls 245 may be used to transfer security information between a security-partner thin client 250 of the mobile station 102 and a security system 200 of the mobile station. The security information is transferred when the respective API call is executed.

The security information may comprise generic malicious behavior patterns that are not specific to the particular model of the mobile station 102, and the security information may be transferred from the security-partner thin client 250 to the security system 200. In addition, the security information may comprise behavior logs, and the security information is transferred from the security system to the security-partner thin client.

The use of a security API allows partner security companies to provide best security on mobile stations and devices without having to concentrate on model-specific details. Security experts at the security partner (e.g., anti-virus company) may define a mapping of behavior to malware. The security partner may concentrate on malicious behavior definition. The malicious behavior definition may be made in a high level language (e.g. XML), and may remain agnostic to phone models, available sensors on phone, etc. The security system 200 of the mobile station 102 may translate the high level behavior definition into phone/mobile-station-model-specific algorithms. This may utilize the mobile station's access to low level drivers and HW to query, and hooks into hardware, sensors, and drivers to enable efficient access.

As an example, the generic malicious behavior pattern may include a vector related to the motion state of the mobile phone or station 102. The motion state of the mobile station may be detected using an accelerometer, a gyroscope, or a combination of information/signals from these sensors. Thus, the motion state vector may include behavior pattern information related to the accelerometer and to the gyroscope.

Figure 6:
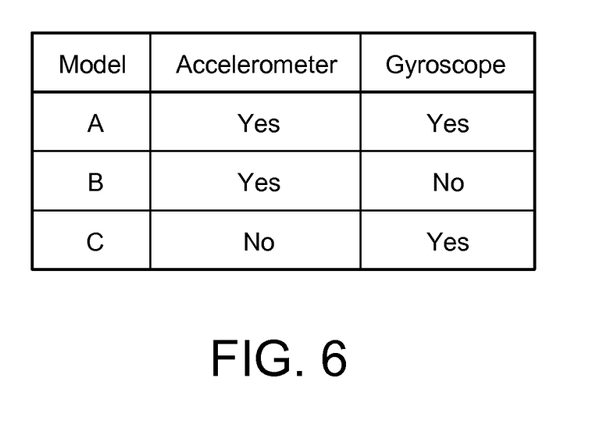
FIG. 6 is a table of mobile station model specific features.

As shown in the table in FIG. 6, the mobile station (MS) model A includes both an accelerometer and a gyroscope. Thus, the mobile-station-model-specific-behavior-analysis algorithms for the MS model A may include information related to the accelerometer and to the gyroscope. However, the MS model B only includes an accelerometer, and the MS model C only includes a gyroscope. Thus, the mobile-station-model-specific-behavior-analysis algorithms for MS model B may only include information related to the accelerometer, whereas the mobile-station-model-specific-behavior-analysis algorithms for MS model C may only include information related to the gyroscope. Similarly, other MS states may be tailored based on the features and functions of the specific MS model.

The security system 200 in the mobile station may dynamically decide what to observe, and at what levels of detail, through efficient query mechanisms and through dynamic interaction of the analyzer with the observer. The queries may be split into human-form and machine-specific-form. The analyzer 230 on the mobile station may determine suspicious behavior based on limited/incomplete information. Techniques for characterizing the behavior of applications to classify the applications as benign or as malware are described in more detail in U.S. Patent Application Publication No. 2013/0247187 (application Ser. No. 13/424,251, filed Mar. 19, 2012), which application is incorporated herein by reference.

Figure 1:
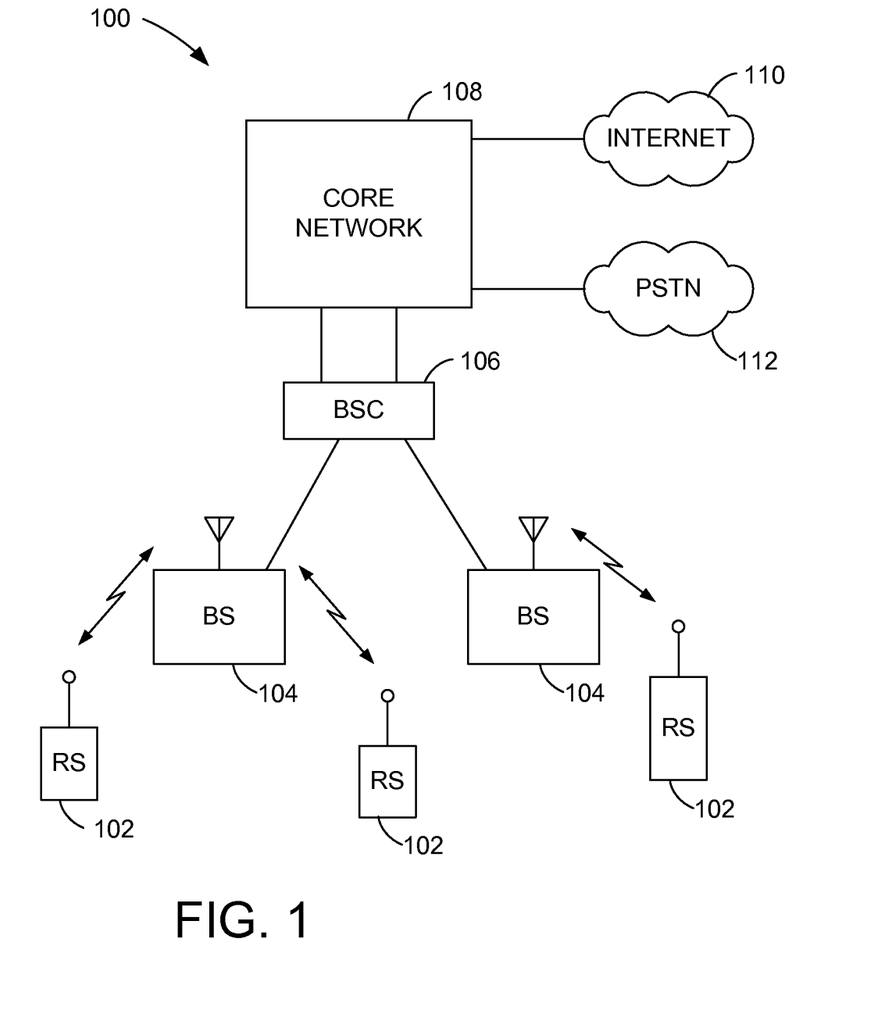
FIG. 1 is a block diagram of an example of a wireless communication system.

With reference to FIG. 1, a wireless remote station (RS) 102 (e.g., a mobile station MS) may communicate with one or more base stations (BS) 104 of a wireless communication system 100, or through a H(e)NB. The wireless communication system 100 may further include one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored as one or more instructions or code on a computer-readable medium. Computer-readable media includes non-transitory computer-readable storage media that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of analyzing a behavior of an application operating in a mobile station, comprising:
    receiving, in a processor of the mobile station, mobile-station-model-agnostic behavior pattern information from a server;
    using, by the processor, the received mobile-station-model-agnostic behavior pattern information to generate a mobile-station-model-specific behavior model in the mobile station;
    monitoring, by the processor, one or more mobile station operations to collect behavior information in the mobile station;
    analyzing, by the processor, the behavior of the application operating on the mobile station by applying the collected behavior information to the generated mobile-station-model-specific behavior model;
    classifying, by the processor, the behavior of the application operating on the mobile station as not benign based on a result of applying the collected behavior information to the mobile-station-model-specific behavior model; and
    removing the application associated with the behavior classified as not benign.

2. The method of claim 1, wherein receiving mobile-station-model-agnostic behavior pattern information from the server comprises receiving information that is not specific to a particular model of the mobile station.

3. The method of claim 1, wherein monitoring one or more mobile station operations to collect behavior information in the mobile station comprises monitoring an activity of a Webkit of the mobile station.

4. The method of claim 1, wherein monitoring one or more mobile station operations to collect behavior information in the mobile station comprises monitoring an activity of a high-level operating system (HLOS) of the mobile station.

5. The method of claim 1, wherein monitoring one or more mobile station operations to collect behavior information in the mobile station comprises monitoring an activity of a kernel of the mobile station.

6. The method of claim 1, wherein monitoring one or more mobile station operations to collect behavior information in the mobile station comprises monitoring an activity of a driver of the mobile station.

7. The method of claim 1, wherein monitoring one or more mobile station operations to collect behavior information in the mobile station comprises monitoring an activity of a hardware component of the mobile station.

8. A mobile station, comprising:
    means for receiving mobile-station-model-agnostic behavior pattern information from a server;
    means for using the received mobile-station-model-agnostic behavior pattern information received from the server to generate a mobile-station-model-specific behavior model in the mobile station;
    means for monitoring one or more mobile station operations to collect behavior information in the mobile station;
    means for analyzing a behavior of an application operating on the mobile station by applying the collected behavior information to the generated mobile-station-model-specific behavior model;
    means for classifying the behavior of the application operating on the mobile station as not benign based on a result of applying the collected behavior information to the mobile-station-model-specific behavior model; and
    means for removing the application associated with the behavior classified as not benign.

9. The mobile station of claim 8, wherein means for receiving mobile-station-model-agnostic behavior pattern information from the server comprises means for receiving information that is not specific to a particular model of the mobile station.

10. A mobile station, comprising:
    a processor configured with processor-executable instructions to perform operations comprising:
        receiving mobile-station-model-agnostic behavior pattern information from a server;
        using the received mobile-station-model-agnostic behavior pattern information to generate a mobile-station-model-specific behavior model in the mobile station;
        monitoring one or more mobile station operations to collect behavior information in the mobile station;
        analyzing a behavior of an application operating on the mobile station by applying the collected behavior information to the generated mobile-station-model-specific behavior model;
        classifying the behavior of the application operating on the mobile station as not benign based on a result of applying the collected behavior information to the mobile-station-model-specific behavior model; and
        removing the application associated with the behavior classified as not benign.

11. The mobile station of claim 10, wherein the processor is configured with processor-executable instructions to perform operations such that receiving mobile-station-model-agnostic behavior pattern information from the server comprises receiving information that is not specific to a particular model of the mobile station.

12. A non-transitory computer readable storage medium having stored thereon processor-executable software instructions configured to cause a processor in a mobile station to perform operations comprising:
   receiving mobile-station-model-agnostic behavior pattern information from a server;
   using the received mobile-station-model-agnostic behavior pattern information received from the server to generate a mobile-station-model-specific behavior model in the mobile station;
   monitoring one or more mobile station operations to collect behavior information in the mobile station;
   analyzing a behavior of an application operating on the mobile station by applying the collected behavior information to the generated mobile-station-model-specific behavior model;
   classifying the behavior of the application operating on the mobile station as not benign based on a result of applying the collected behavior information to the mobile-station-model-specific behavior model; and
   removing the application associated with the behavior classified as not benign.

13. The non-transitory computer readable storage medium of claim 12, wherein the stored processor-executable software instructions are configured to cause a processor to perform operations such that receiving mobile-station-model-agnostic behavior pattern information from the server comprises receiving information that is not specific to a particular model of the mobile station.

\* \* \* \* \*